(12) United States Patent
Karabinis

(10) Patent No.: US 6,650,868 B1
(45) Date of Patent: Nov. 18, 2003

(54) MOBILE SATELLITE PHONE SYSTEM INCORPORATING SYMMETRICAL AND NON-SYMMETRICAL WAVEFORM MODES

(75) Inventor: Peter D. Karabinis, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 943 days.

(21) Appl. No.: 08/798,137

(22) Filed: Feb. 12, 1997

(51) Int. Cl.$^7$ ................................................ H04Q 7/20
(52) U.S. Cl. ...................... 455/12.1; 455/12.1; 455/427; 455/553.1
(58) Field of Search ................................ 455/12.1, 13.1, 455/13.2, 427, 428, 429, 517, 20, 21, 22, 454, 552, 553, 11.1, 422, 62, 266, 340; 370/319, 321, 316, 465

(56) References Cited

U.S. PATENT DOCUMENTS

| | | | |
|---|---|---|---|
| 5,020,093 A | | 5/1991 | Pireh |
| 5,091,942 A | | 2/1992 | Dent |
| 5,148,358 A | | 9/1992 | Estes, Jr. |
| 5,282,250 A | | 1/1994 | Dent et al. |
| 5,390,245 A | | 2/1995 | Dent et al. |
| 5,434,586 A | * | 7/1995 | Kinoshita et al. ............ 343/840 |
| 5,437,051 A | * | 7/1995 | Oto ............................ 455/3.02 |
| 5,523,997 A | * | 6/1996 | Bishop, Jr. .................. 455/13.1 |
| 5,539,730 A | | 7/1996 | Dent |
| 5,579,319 A | * | 11/1996 | Daniel ....................... 455/234.1 |
| 5,619,525 A | * | 4/1997 | Wiedeman et al. ............ 455/69 |
| 5,652,750 A | * | 7/1997 | Dent et al. .................. 455/427 |
| 5,663,957 A | * | 9/1997 | Dent ........................... 370/468 |
| 5,669,062 A | * | 9/1997 | Olds et al. .................. 455/12.1 |
| 5,689,803 A | * | 11/1997 | Tayloe ....................... 455/12.1 |
| 5,761,608 A | * | 6/1998 | Andressen et al. ......... 455/13.1 |
| 5,796,772 A | * | 8/1998 | Smith et al. ................. 455/422 |
| 5,835,057 A | * | 11/1998 | van Heyningen .......... 342/359 |
| 5,914,942 A | * | 6/1999 | Hassan et al. .............. 370/316 |
| 6,151,497 A | * | 11/2000 | Yee et al. .................... 455/430 |
| 6,160,993 A | * | 12/2000 | Wilson ....................... 455/12.1 |
| 6,356,539 B1 | * | 3/2002 | Zuliani et al. .............. 370/320 |
| 6,381,227 B1 | * | 4/2002 | Fielding et al. ............. 370/321 |
| 6,501,938 B1 | * | 12/2002 | Suenaga et al. ........... 455/3.02 |

FOREIGN PATENT DOCUMENTS

| | | |
|---|---|---|
| EP | 0 748 063 A2 | 12/1996 |
| WO | WO 92/21195 | 11/1992 |
| WO | WO 96/28900 | 9/1996 |

OTHER PUBLICATIONS

Patent Abstracts of Japan, vol. 095, No. 001, Feb. 28, 1995, JP 6–303161.

* cited by examiner

Primary Examiner—Dwayne Bost
Assistant Examiner—Jean Gelin
(74) Attorney, Agent, or Firm—Myers Bigel Sibley & Sajovec PA

(57) ABSTRACT

An improved multi-mode telephone for use in an improved satellite communication method and system. The telephone is selectively capable of receiving signals at different carrier bandwidths, such that a satellite communication system having a non-symmetrical air interface can be easily implemented without requiring rate conversion hardware or software at the satellite for direct mobile-to-mobile communications.

13 Claims, 5 Drawing Sheets

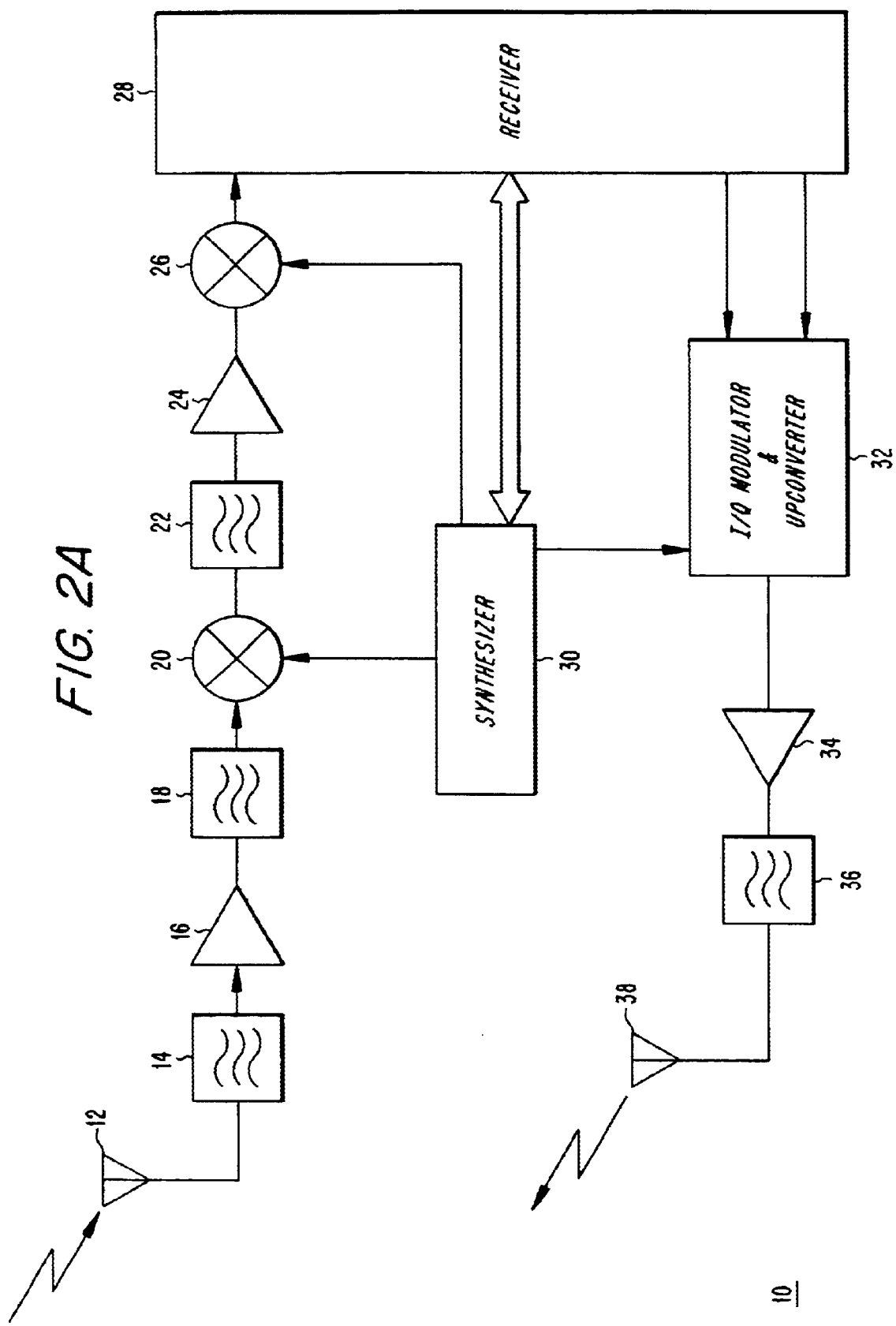

MOBILE SATELLITE PHONE SYSTEM INCORPORATING SYMMETRICAL AND NON-SYMMETRICAL WAVEFORM MODES

FIELD OF THE INVENTION

The present invention generally relates to satellite communication systems. More particularly, the present invention is directed to a satellite communication system capable of operating in a "mobile-to-mobile" mode in which mobile units communicate substantially directly via a satellite.

BACKGROUND OF THE INVENTION

At the present time, there are many proposals for mobile satellite systems, in which orbiting satellites would support communication (including voice, data, and fax) with dual-mode (cellular/satellite) mobile or handheld phones. FIG. 1 illustrates a block diagram of a satellite communications system. An orbiting satellite 110 is in communication with at least one ground station or outstations called the HUB 100 as well as with a number of portable mobile stations or phones 120. The phones are each serviced by an appropriate antenna beam from a multiple spot-beam antenna on the satellite providing high gain in the direction of each phone. The HUB communicates with the satellite using, for example, C-band or K-band frequencies, while the satellite communicates with the phones using, for example, L-band or S-band frequencies. Such a satellite system can operate in multiple modes. In a first mode, communication links can be established between communication devices (e.g., standard telephone or mobile telephone) which, as a result of the respective locations of the communication devices, incorporate Public Switched Telephone Network (PSTN) equipment. In a second mode, a so-called "mobile-to-mobile" mode, communication links are established substantially directly between mobile units via the satellite. The "mobile-to-mobile" mode substantially reduces the signal delay by allowing a first mobile to communicate with a second mobile directly via the satellite transponder without requiring the signal of the transmitting mobile to go to the HUB then back up to the satellite, and finally to the receiving mobile. Mobile-to-mobile communication is discussed in detail in the copending, commonly assigned application entitled "Method and Apparatus for Enabling Mobile-to Mobile Calls in a Communication System", filed on Jul. 30, 1996 and having Ser. No. 08/681,916, the entirety of which is incorporated by reference.

A satellite communication system can have a symmetrical or non-symmetrical air interface. In a symmetrical air interface, both the downlink and uplink carrier waveforms occupy the same channel bandwidth. In a non-symmetrical air interface, the downlink carrier waveform occupies a first channel bandwidth (e.g., 200 kHz) and the uplink carrier waveform occupies a second channel bandwidth (e.g., 50 kHz). In a typical non-symmetrical satellite system operating in a mobile-to-mobile mode, a converter located in the satellite or in the ground station converts signals between the first and second carrier bandwidths. Mobile units in such a system transmit communication signals at a first carrier bandwidth (e.g., 50 kHz) and receive communication signals at a second carrier bandwidth (e.g., 200 kHz). A converter adds power consumption, weight, cost and complexity to the satellite. Accordingly, it would be desirable to eliminate the converter, such that mobile units operating in a mobile satellite system would be able to communicate in a "mobile-to-mobile" mode without requiring a carrier bandwidth conversion at the satellite.

SUMMARY OF THE INVENTION

The present invention overcomes the above-described problems, and provides additional advantages, by providing for a method, system and mobile unit which enables a non-symmetrical mobile satellite system to operate in a "mobile-to-mobile" mode without requiring carrier bandwidth conversion at the satellite. More particularly, according to a preferred embodiment of the invention, an additional mode capability is added to the receiver of each mobile unit, such that, when in the mobile-to-mobile mode, the receiver can receive the first carrier bandwidth (50 kHz) without requiring conversion to the normal second carrier bandwidth (200 kHz). The mobile unit is provided with two receiver paths and a switch. When in a first mode (PSTN-to-mobile), the switch is controlled to select the first receiver path so as to receive signals at the normal second carrier bandwidth. When in the second mode (mobile-to-mobile), the switch is controlled to select the second receiver path so that the mobile unit can receive unconverted signals at the first carrier bandwidth.

According to the present invention, a non-symmetrical air interface in a satellite communication system can be supported without requiring bandwidth conversion to be performed at the satellite, thus reducing payload hardware and software.

BRIEF DESCRIPTION OF THE DRAWINGS

A more complete understanding of the present invention can be obtained upon reading the following Detailed Description of the Preferred Embodiments, in conjunction with the accompanying drawings, in which like reference indicators are used to designate like elements, and in which:

FIGS. 2A–B are block diagrams of a conventional mobile phone and a mobile phone according to the present invention, respectively.

DETAILED DESCRIPTION OF THE PREFERRED EMBODIMENTS

Figure 1:
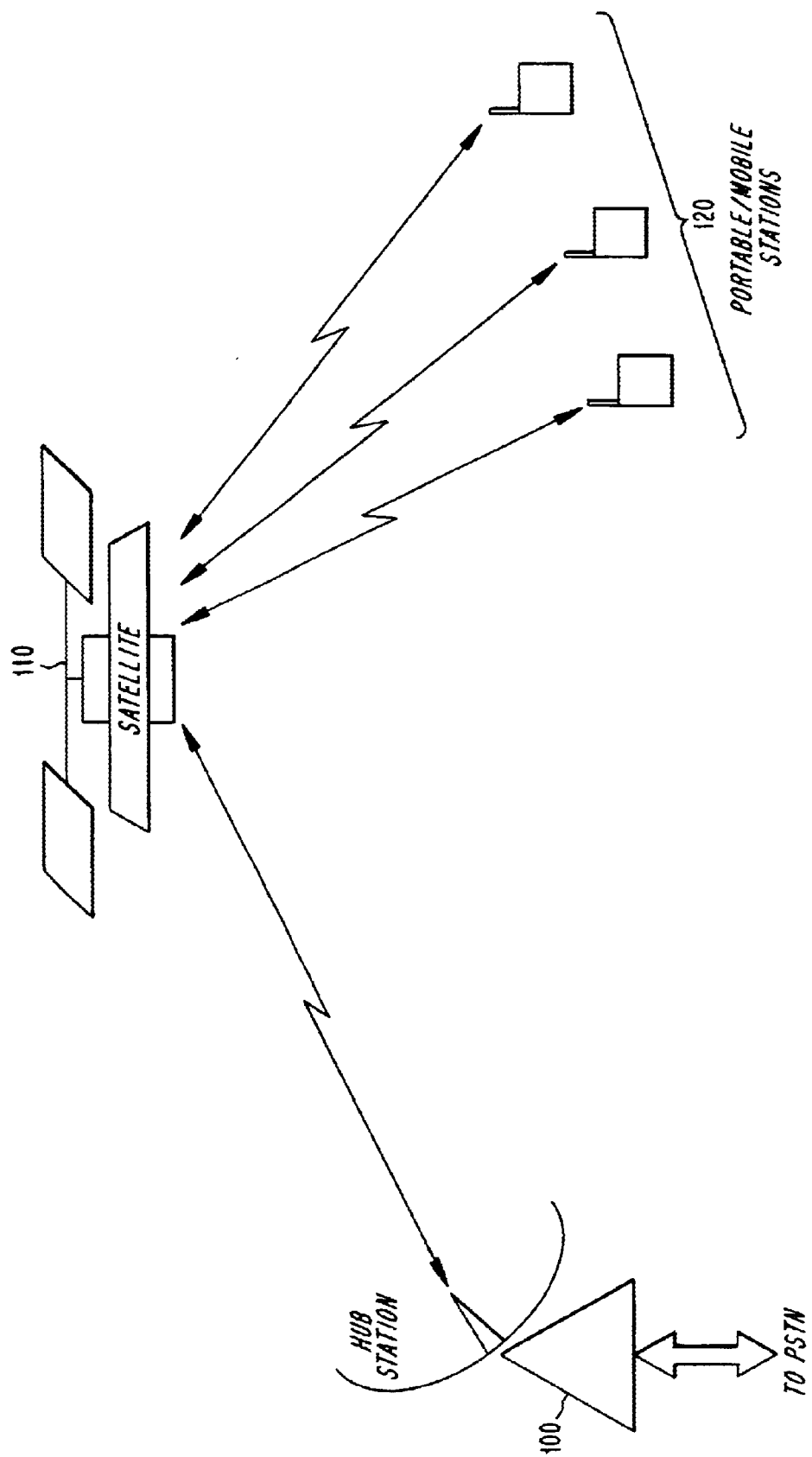
FIG. 1 shows a satellite communication system in which the present invention can be implemented.

Referring now to FIG. 2A, major components of a conventional mobile phone are shown in block diagram form. The mobile phone 10 has a receiver path which includes a receive antenna 12 for receiving communication signals (e.g., from a satellite), a first receive filter 14, a low noise amplifier 16, a second receive filter 18, a mixer 20, a third receive filter 22, an amplifier 24, a second mixer 26, and receiver processing circuitry 28. A synthesizer 30 exchanges signals with the receiver processing circuitry 28 and provides inputs to the mixers 20 and 26. The third receive filter 22 is selected according to the frequency of the downlink carrier bandwidth (e.g., 200 kHz). The mobile phone 10 further has a transmitter path which includes an I/Q modulator and upconverter 32, a power amplifier 34, a transmission filter 36, and a transmit antenna 38, connected as shown. The I/Q modulator 32 receives signals from the receiver processing circuitry 28 and synthesizer 30 and modulates and upconverts the signal intended for transmission.

Figure 2B:
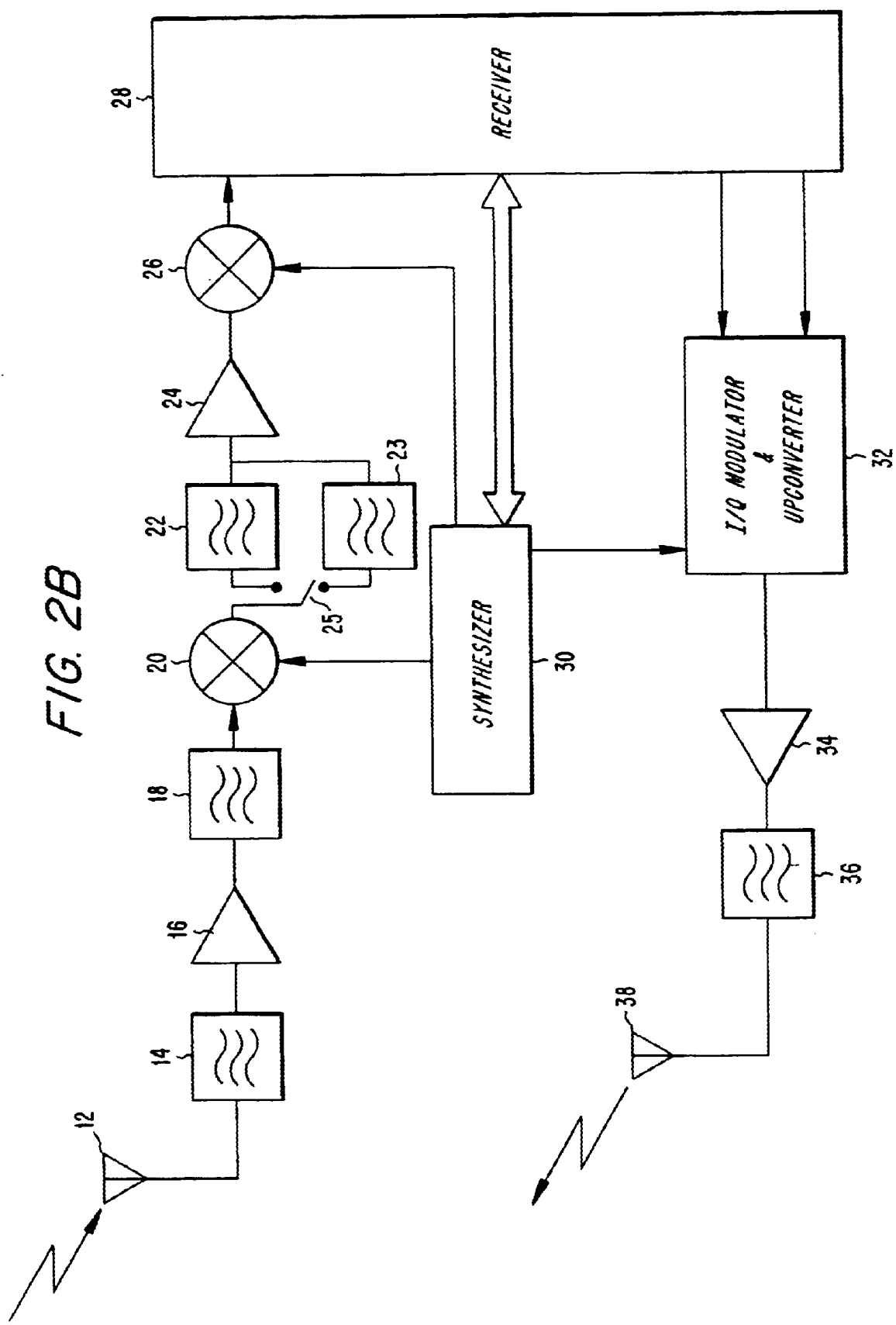
Figure 3A:
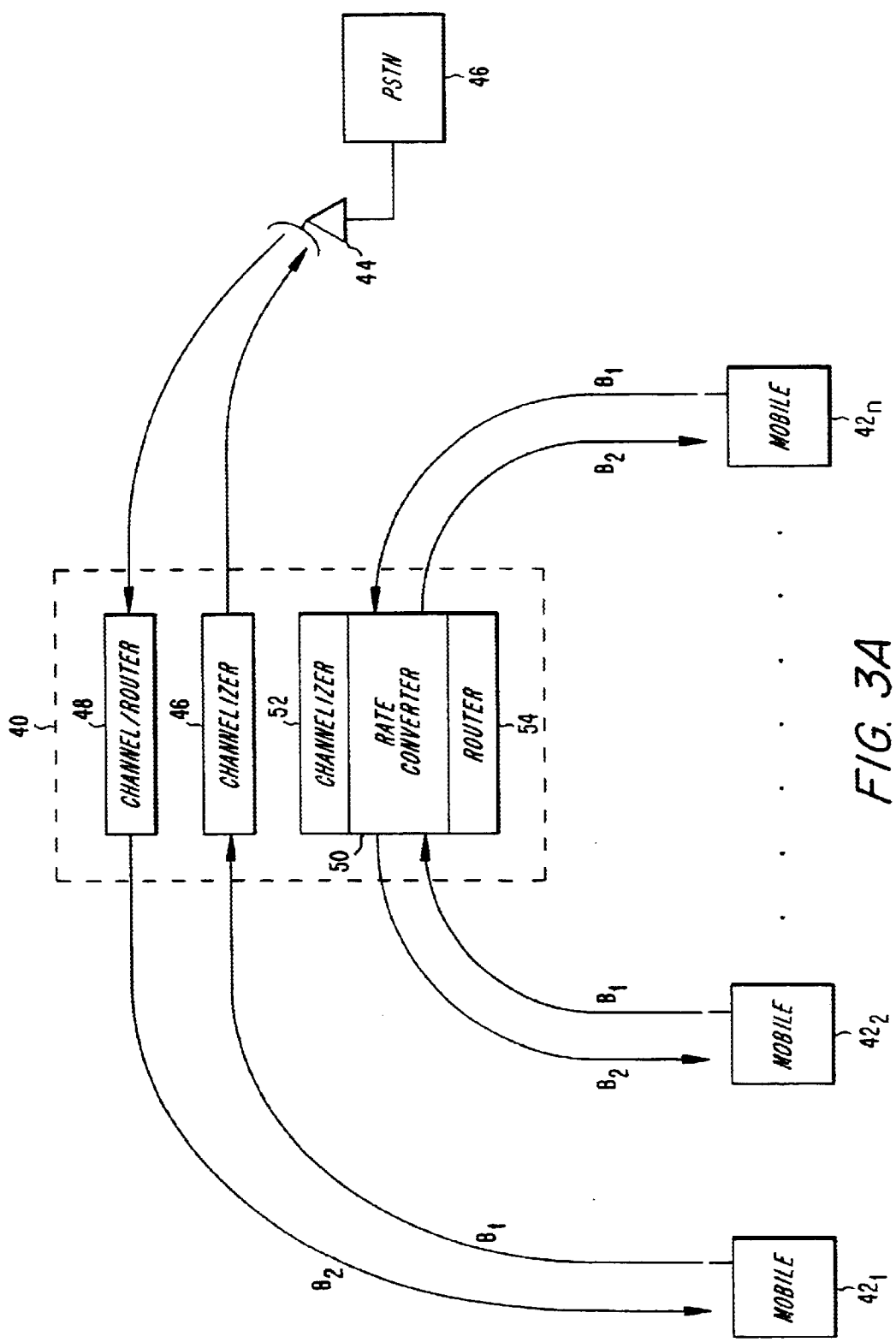
FIGS. 3A–B are more detailed block diagrams of a conventional mobile satellite system and a mobile satellite system according to the present invention, respectively.

Referring now to FIG. 3A, a block diagram of a conventional satellite communications system having a non-symmetrical interface is shown. The system includes a satellite 40 and a plurality of mobile telephones $42_1, 42_2, \ldots 42_n$. Each mobile telephone $42_1, \ldots 42_n$ is of the type shown and described with respect to FIG. 2A above, and thus transmits communication signals to the satellite at a first carrier channel spacing (e.g., 50 kHz), and receives signals from the satellite at a second carrier channel spacing (e.g., 200 kHz). In the communication system of FIG. 3A, mobile telephone $42_1$ is operating in a first mode, in which a mobile link is established between the mobile telephone $42_1$ and the satellite 40, and a feeder link is established between the satellite 40 and a ground station 44 associated with a public switched telephone network (PSTN) 46. The mobile telephone $42_1$ transmits signals (e.g., at a 50 kHz carrier bandwidth $B_1$) to the ground station 44 via a channelizer 46 contained in the satellite 40, and the mobile telephone $42_1$ receives signals (e.g., at a 200 kHz carrier bandwidth $B_2$) from the ground station 44 via a channelizer and router 48 contained in the satellite 40. In the communication system of FIG. 3A, mobile telephones $42_2$ and $42_n$ are operating in a second mode (mobile-to-mobile). In this mode, channelization and routing are performed by channelizer 52 and router 54. Signals transmitted between mobile telephone $42_2$ and mobile telephone $42_n$ are converted from a first carrier bandwidth (50 kHz) to a second carrier bandwidth (200 kHz) by rate converter 50. Rate conversion is necessary because the mobile telephones $42_1, \ldots 42_n$ can receive only signals transmitted at the second carrier bandwidth (e.g., 200 kHz).

Referring now to FIG. 2B, a mobile phone architecture according to a preferred embodiment of the present invention is shown. The phone includes the same principal components shown in FIG. 2A, but also includes an additional receive filter 23. The receive filter 23 is selected in response to a command from the HUB (or ground station 44) to initiate communications in the mobile-to-mobile mode. According to this embodiment, the receive filter 22 is a 200 kHz filter, and receive filter 23 is a 50 kHz filter. A switch 25 operates to select a receiver path which includes one of the receive filters 22 or 23. This arrangement enables the mobile telephone to receive communication signals from the satellite at either a first carrier bandwidth (e.g., 200 kHz) used by the communication system in a first mode (PSTN-to-mobile) or receive signals from the satellite at a second carrier bandwidth (e.g., 50 kHz) used by the communication system in a second mode (mobile-to-mobile).

The switch 25 can select the appropriate receiver path, for example, according to call setup information provided to the mobile by ground station 44. As will be appreciated by those skilled in the art, call setup information provides a mobile telephone with, for example, frequency time slot assignments which are required to establish communication with the mobile telephone. According to this exemplary embodiment, the ground station 44 recognizes when an anticipated communication link between two mobile phones can be established in the mobile-to-mobile mode. When this condition is recognized, ground station 44 includes, in the call setup information provided to the mobile telephones, a command which causes the switch 25 to select the appropriate receiver path.

Figure 3B:
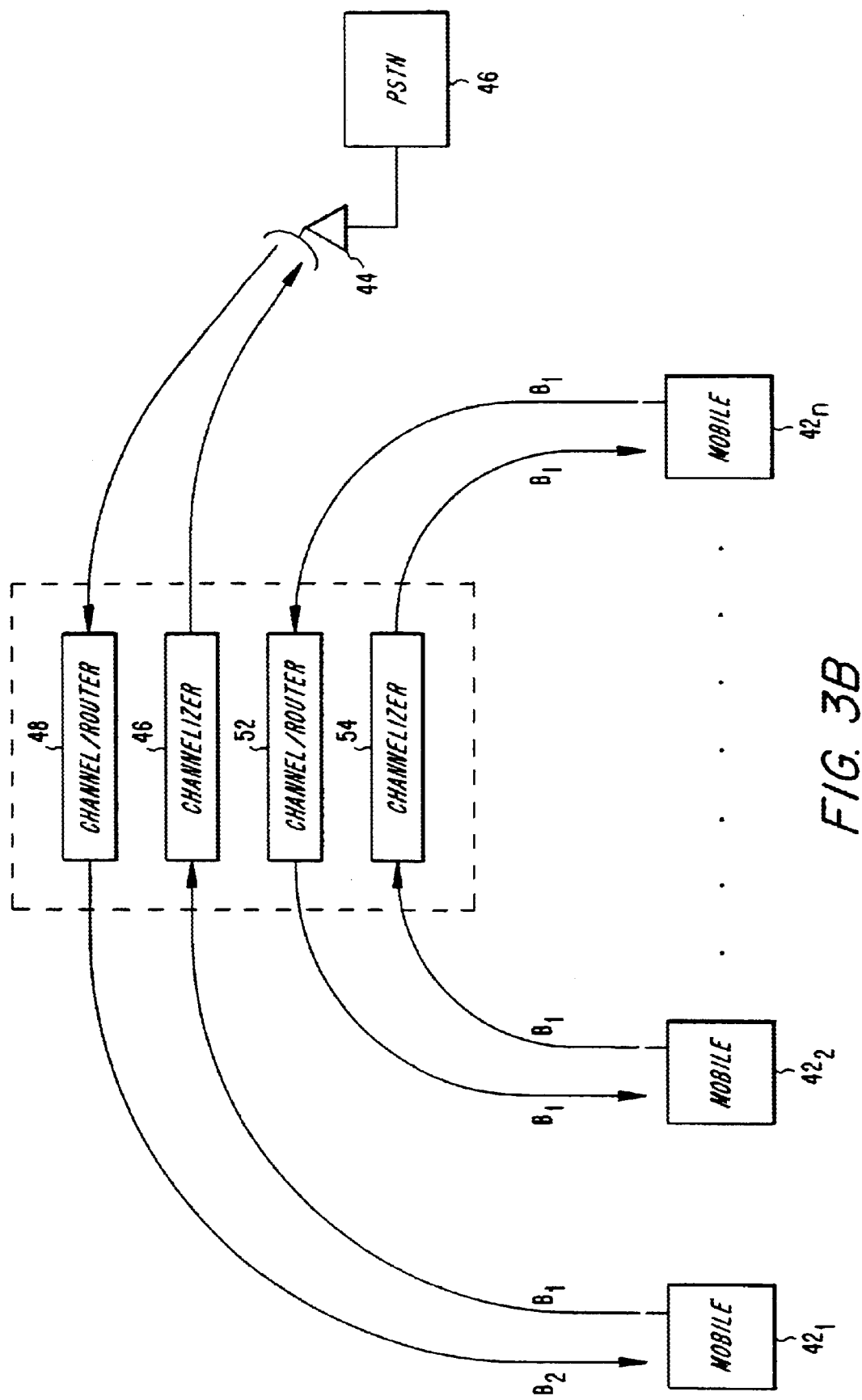

Referring now to FIG. 3B, a satellite communication system incorporating a non-symmetrical air interface according to the present invention is shown. In this embodiment, the mobile telephones $42_1, \ldots 42_n$ have architectures similar to the mobile telephone shown and described with respect to FIG. 2B. Because such mobile telephones are capable of selectively receiving signals transmitted at different carrier bandwidths, no rate conversion is necessary; therefore, the satellite communication system of FIG. 3B does not include a rate converter 50.

While the foregoing description includes numerous details and specificities, it is to be understood that these are for purposes of explanation only. Many modifications will be readily apparent to those of ordinary skill in the art which are clearly within the spirit and scope of the invention, as defined by the following claims and their legal equivalents.

What is claimed is:

1. A satellite communications system, comprising:

a satellite; and a plurality of mobile communication devices, wherein the system operates in a first mode, in which each device transmits signals to the satellite at a first carrier bandwidth and receives signals from the satellite at a second carrier bandwidth, and selectively operates in a second mode, in which each device transmits signals to the satellite and receives signals from the satellite at the first carrier bandwidth.

2. The system of claim 1, further comprising a converter for converting the signals between the first carrier bandwidth and the second carrier bandwidth when the system operates in the first mode.

3. The system of claim 1, wherein each mobile communication device includes a receiver having a switch and at least two receiver paths, the switch operable to select a first receiver path for receiving the second carrier bandwidth in the first mode of operation and a second receiver path for receiving the first carrier bandwidth in the second mode of operation.

4. The system of claim 1, wherein the first carrier bandwidth is approximately 50 kHz, and the second carrier bandwidth is approximately 200 kHz.

5. The system of claim 1, wherein the devices operating in the second mode of operation communicate with each other substantially directly via the satellite.

6. The system of claim 1, wherein the devices operating in the first mode of operation communicate with each other via the satellite and equipment associated with a public switched telephone network (PSTN).

7. The system of claim 3, wherein the switch selects between the first receiver path and the second receiver path based on call setup information provided to the mobile communication device.

8. A method for exchanging communication signals in a communication system, comprising the steps of:

establishing, in a first mode of operation, a first communication link between a first communication device, a satellite, a control station associated with the satellite, and a second communication device, the first communication device transmitting signals to the satellite at a first carrier bandwidth and the second communication device receiving signals at a second carrier bandwidth;

establishing, in a second mode of operation, a second communication link between the first communication device, the satellite, and a second communication device, the first communication device transmitting signals to the satellite at the first carrier bandwidth and the second communication device receiving signals from the satellite at the first carrier bandwidth.

9. The method of claim 8, further comprising the step of converting, at the control station associated with the satellite, signals between the first carrier bandwidth and the second carrier bandwidth in the first communication link.

10. The method of claim 9, wherein the control station is further associated with a public switched telephone network.

11. The method of claim 8, further comprising the steps of:

filtering, in the second communication device, the received signals over the first communication link in a first filter; and filtering, in the second communication device, the received signals over the second communication link in a second filter.

12. The method of claim 8, wherein the first carrier bandwidth is approximately 50 kHz, and the second carrier bandwidth is approximately 200 kHz.

13. The method of claim 8, further comprising the steps of:

selecting between the first mode and the second mode; and providing call setup information to direct the communication devices to receive signals at the first carrier bandwidth or at the second carrier bandwidth.

* * * * *